(12) United States Patent
Zhan et al.

(10) Patent No.: US 11,749,829 B2
(45) Date of Patent: Sep. 5, 2023

(54) SERIES-PARALLEL SWITCHING DEVICE AND BATTERY PACK INCLUDING SERIES-PARALLEL SWITCHING DEVICE

(71) Applicant: DONGGUAN NVT TECHNOLOGY CO., LTD., Dongguan (CN)

(72) Inventors: Guoping Zhan, Dongguan (CN); Shengxuan Wang, Dongguan (CN); Guanghui Chen, Dongguan (CN)

(73) Assignee: DONGGUAN NVT TECHNOLOGY CO., LTD., Dongguan (CN)

( * ) Notice: Subject to any disclaimer, the term of this patent is extended or adjusted under 35 U.S.C. 154(b) by 623 days.

(21) Appl. No.: 16/827,138

(22) Filed: Mar. 23, 2020

(65) Prior Publication Data
US 2020/0321649 A1 Oct. 8, 2020

(30) Foreign Application Priority Data
Apr. 8, 2019 (CN) .......................... 201910277610.9

(51) Int. Cl.
| | | |
|---|---|---|
| *H01M 10/04* | (2006.01) | |
| *H02J 7/00* | (2006.01) | |
| *H01M 10/42* | (2006.01) | |
| *H01M 10/44* | (2006.01) | |
| *H01M 10/48* | (2006.01) | |

(52) U.S. Cl.
CPC ..... *H01M 10/0445* (2013.01); *H01M 10/425* (2013.01); *H01M 10/441* (2013.01); *H01M 10/482* (2013.01); *H02J 7/0024* (2013.01); *H01M 2010/4271* (2013.01)

(58) Field of Classification Search
CPC ........... H01M 10/0445; H01M 10/425; H01M 10/441; H01M 10/482; H01M 2010/4271; H02J 7/0024
See application file for complete search history.

(56) References Cited

U.S. PATENT DOCUMENTS

| | | | | |
|---|---|---|---|---|
| 2009/0066291 A1* | 3/2009 | Tien | ...................... | H02J 7/0016 320/118 |
| 2010/0147354 A1* | 6/2010 | Takehara | ................ | H02J 3/381 136/244 |
| 2011/0001456 A1* | 1/2011 | Wang | .................... | H02J 7/0016 320/117 |

(Continued)

FOREIGN PATENT DOCUMENTS

| | | |
|---|---|---|
| CN | 102624052 A | 8/2012 |
| CN | 202405823 U | 8/2012 |
| CN | 105958144 A | 9/2016 |

*Primary Examiner* — Alexander Usyatinsky
(74) *Attorney, Agent, or Firm* — Juan Carlos Marquez; Marquez IP Law Office, PLLC

(57) ABSTRACT

The present application relates to a series-parallel switching device and a battery pack including the series-parallel switching device. The series-parallel switching device used for the battery pack is disclosed. The battery pack includes a first battery and a second battery. The switching device includes: a switching circuit, which is configured to be electrically coupled with the first battery and the second battery, where the switching circuit is configured to receive a control signal, and the switching circuit is controlled by the control signal to switch the first battery and the second battery between a parallel state and a series state, or switch the first battery or the second battery to a disconnection state.

16 Claims, 20 Drawing Sheets

(56) References Cited

U.S. PATENT DOCUMENTS

| | | | |
|---|---|---|---|
| 2011/0298424 A1* | 12/2011 | Yamauchi | B60L 58/12 |
| | | | 320/118 |
| 2013/0249297 A1* | 9/2013 | Takehara | H01L 31/02021 |
| | | | 307/71 |
| 2014/0079963 A1* | 3/2014 | Takeuchi | H02J 7/0016 |
| | | | 429/52 |

* cited by examiner

SERIES-PARALLEL SWITCHING DEVICE AND BATTERY PACK INCLUDING SERIES-PARALLEL SWITCHING DEVICE

CROSS REFERENCE TO RELATED APPLICATIONS

The present application claims the benefit of priority from the China Patent Application No. 201910277610.9, filed on 8 Apr. 2019, the disclosure of which is hereby incorporated by reference in its entirety.

BACKGROUND

1. Technical Field

The present application relates to the technical field of batteries, and in particular, relates to a series-parallel switching device and a battery pack including the series-parallel switching device.

2. Description of the Related Art

At present, with the rapid development of information equipment, such as mobile phones, tablet computers and other such technologies, hardware performance of the information equipment, such as a mobile phone or a tablet computer, has increasingly grown. For example, an update of a GPU (Graphics Processing Unit) or a CPU (Central Processing Unit) of a mobile phone, a large screen, a folding screen, double screens or a 5G (5th-Generation mobile communication technology) mobile phone may likely consume larger electric quantity. Furthermore, the functions of the information equipment, such as the mobile phone and the tablet computer, are richer and more experiential, as daily routines are transferred into apps (Applications) for telephony, messaging, shopping, entertainment, payment, transportation, industry software, etc. Use frequency of the information equipment, such as the mobile phone and the tablet computer, is greater, and use time has been vastly extended, so that more stringent requirements are proposed for the cruising ability or endurance of a mobile phone and the effective utilization (such as charging efficiency) of a battery.

SUMMARY

According to some embodiments of the present application, a series-parallel switching device used for a battery pack is disclosed. The battery pack includes a first battery and a second battery. The switching device includes a switching circuit configured to be electrically coupled with the first battery and the second battery, where the switching circuit is configured to receive a control signal, and the switching circuit is controlled by the control signal to switch the first battery and the second battery between a parallel state and a series state, or switch the first battery or the second battery to a disconnection state.

According to some embodiments of the present application, a battery pack device includes a battery pack and a switching device, where the battery pack is electrically coupled with the switching device, and the battery pack includes a plurality of batteries.

BRIEF DESCRIPTION OF THE DRAWINGS

The following will briefly illustrate the accompanying drawings necessary to describe the embodiments of the present application or the prior art so as to facilitate the description of the embodiments of the present application. Obviously, the accompanying drawings described below are only part of the embodiments of the present application. For those skilled in the art, the accompanying drawings of other embodiments can still be obtained according to the structures illustrated in the accompanying drawings without any creative effort.

DETAILED DESCRIPTION

Figure 1:
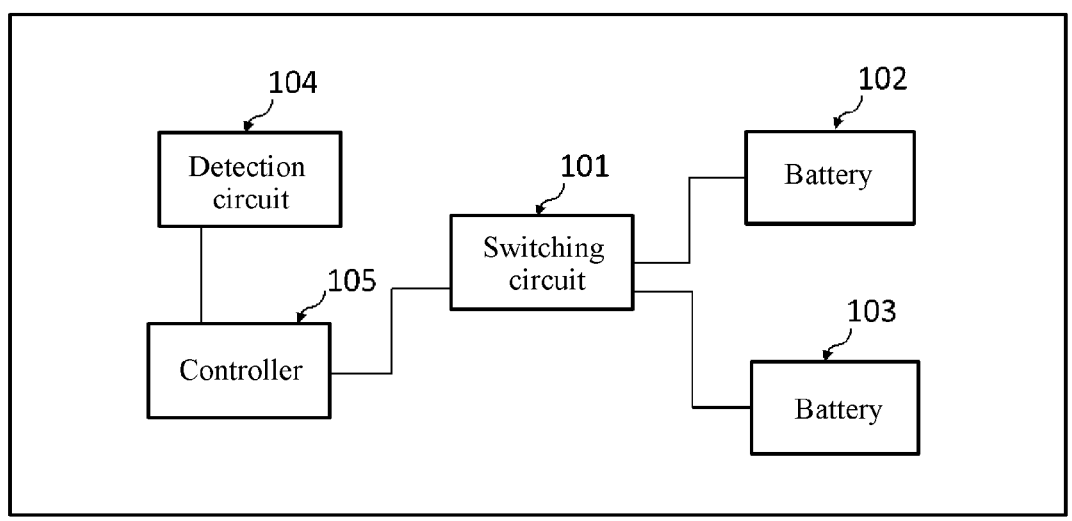
FIG. 1 is a schematic diagram of a circuit structure of a switching device according to some embodiments of the present application.

Embodiments of the present application are described in detail below. Throughout the specification, the same or similar components and components having the same or similar functions are denoted by similar reference numerals. The embodiments described herein with respect to the accompanying drawings are illustrative and graphical, and are used for providing a basic understanding of the present application. The embodiments of the present application should not be construed as limiting the present application.

FIG. 1 is a schematic diagram of a circuit structure of a switching device 100 according to some embodiments of the present application. The switching device 100 includes a switching circuit 101, a battery 102, a battery 103, a detection circuit 104 and a controller 105. The switching circuit 101 is electrically coupled with the battery 102 and the battery 103. The detection circuit 104 is used for detecting a circuit state. The controller 105 is used for generating a control signal according to the circuit state and sending or transmitting the control signal to the switching circuit 101. The switching circuit 101 receives the control signal, and the switching circuit 101 is controlled by the control signal to switch the battery 102 and the battery 103 between a parallel state and a series state, or switch the battery 102 or the battery 103 to a disconnection state.

In some embodiments, the detection circuit 104 can be used for detecting the circuit state of the switching circuit 101, the circuit state of the switching device 100, and the circuit state of the circuit connected to the switching device 100 or information equipment in which the switching device 100 is located. For example, the detection circuit 104 can be used for detecting the voltage values of the charging terminals or the discharging terminals of the battery 102 and the battery 103 to determine whether the battery 102 and the battery 103 are in a charging state or in a discharging state. The detection circuit 104 also can be used for detecting voltage values and current values of the charging terminals of the battery 102 and the battery 103 in a charging state to determine the charging power. The detection circuit 104 also can be used for detecting a voltage value of the two terminals of the battery 102 and a voltage value of the two terminals of the battery 103. The detection circuit 104 also can be used for detecting the electric quantities of the battery 102 and the battery 103. Circuit parameters or circuit states detected by the detection circuit 104 are not limited thereto, and corresponding circuits can be selected according to actual conditions to realize detection, thereby acquiring corresponding circuit states.

The circuit state includes the voltage values of the battery 102 and the battery 103. The circuit state may also include the charging power of the battery 102 and the battery 103. The circuit state may also include the electric quantity of at least one of the battery 102 and the battery 103. The circuit state may include: the battery 102 and the battery 103 are in a charging state or a discharging state. The circuit state may also include: the battery 102 and the battery 103 are in a series state or a parallel state. According to different load circuits powered by the switching circuit and the battery pack (such as the battery 102 and the battery 103) in different information equipment, the required circuit state can be determined according to actual conditions but is not limited thereto. According to different load circuits powered by the switching circuit and the battery pack (such as the battery 102 and the battery 103) in different information equipment, the required circuit state can be determined as required according to actual conditions. In some embodiments, the information equipment can be a mobile phone, a tablet computer, a computer, a notebook computer, wearable equipment, vehicle-mounted intelligent equipment or the like, but is not limited thereto.

In some embodiments, when the battery 102 and the battery 103 are in a charging state and a series state, the detection circuit 104 detects the voltage values of the battery 102 and the battery 103, and the voltage values are sent to the controller 105. The controller 105 determines a voltage difference between the battery 102 and the battery 103 according to the voltage values. When the voltage difference is greater than a threshold V1, a control signal is generated, the switching circuit 101 switches the battery 102 and the battery 103 in a charging state from a series state to a parallel state according to the control signal, so that the battery 102 and the battery 103 enter an active equalization mode so as to reduce the voltage difference, and the active equalization mode has no energy loss or waste. When the voltage difference is less than or equal to a threshold V2, the controller 105 cannot generate the control signal, or the controller 105 generates a signal for enabling the battery 102 and the battery 103 to keep a series state. When the voltage difference is less than or equal to the threshold V2, the action mode of the controller 105 is not limited thereto. The threshold V1 can be set to 15 mV, and the threshold V2 can be set to 10 mV. In some embodiments, the threshold V1 can be the same as the threshold V2. It should be noted that the threshold V1 and the threshold V2 can be selected according to actual conditions.

In some embodiments, when the battery 102 and the battery 103 are in a charging state and a parallel state, the detection circuit 104 detects the charging power of the battery 102 and the battery 103, and the charging power of the battery 102 and the battery 103 is determined by charging voltage and charging current. The controller 105 generates a control signal when the charging power is greater than a threshold P1. The switching circuit 101 switches the battery 102 and the battery 103 in a charging state from a parallel state to a series state according to the control signal. Specifically, the threshold P1 of the charging power can be determined according to standard charging power of the battery pack. For example, when the standard charging power of the battery pack is 5 W, the threshold P1 is set to 5 W. Accordingly, when the charging power is greater than 5 W, such as high-power charging (if the standard charging power is 5 W, the high-power charging means that the charging power is 10 W or higher) or fast charging (if the standard charging voltage is 5V, the fast charging means that the charging voltage is greater than 5V), and the switching circuit 101 is switched to, to switch the battery 102 and the battery 103 from a parallel state to a series state. Because the battery 102 and the battery 103 are switched from the parallel state to a series state, the voltages of the two terminals of the battery 102 and the battery 103 may be increased, and the current of a loop may be reduced. Therefore, a charging rate is reduced, heat production and temperature rise on the loop are further reduced, the cycle life of the batteries is benefited, and meanwhile, use specifications and component costs are further reduced.

In some embodiments, when the battery 102 and the battery 103 are in a discharging state and a series state, the detection circuit 104 detects the voltage value of at least one of the battery 102 and the battery 103. The controller 105 generates a control signal when the voltage value of the battery 102 or the voltage value of the battery 103 is within a preset threshold range V3-V4. The switching circuit 101 switches the battery 102 and the battery 103 in a discharging state from a series state to a parallel state according to the control signal. Specifically, the preset threshold range V3-V4 can be determined according to system operation voltage specified by the information equipment. For example, when the system operation voltage is 3.3V, V3 can be 3.3V, and V4 can be 4.4V, and thus, the preset threshold range V3-V4 is 3.3V-4.4V. When the voltage value of at least one of the battery 102 and the battery 103 is in the range of 3.3V-4.4V, the controller 105 generates a control signal, so that the switching circuit 101 switches the battery 102 and the battery 103 from a series state to a parallel state. Therefore, the power supply voltages of the two terminals of the battery 102 and the battery 103 are reduced, the voltage difference between input and output of the battery pack switching circuit is reduced, and the switching efficiency of the power supply voltage of the battery pack is increased by means of the reduction of the voltage difference. Furthermore, in a discharging process, because the battery 102 and the battery 103 are connected in parallel, the voltage difference between the battery 102 and the battery 103 can be actively equalized so as to ensure equalization between the battery 102 and the battery 103.

In some embodiments, when the battery 102 and the battery 103 are in a discharging state and a parallel state, the detection circuit 104 detects the voltage value and electric quantity of at least one of the battery 102 and the battery 103. The controller 105 generates a control signal when the voltage value is less than a threshold V5 and the electric quantity is greater than a threshold T1. The switching circuit 101 switches the battery 102 and the battery 103 in a discharging state from a parallel state to a series state according to the control signal. Specifically, the threshold V5 and the threshold Ti can be determined according to minimum battery voltage and electric quantity specified by the information equipment, the threshold V5 can be 3.3V, and the threshold Ti can be 10%. When the voltage value of at least one of the battery 102 and the battery 103 is less than 3.3V and the electric quantity of at least one of the battery 102 and the battery 103 is greater than 10%, the controller 105 generates a control signal. The batteries made of different materials have different electric quantity values at different voltages. For example, a battery made of a silicon anode material still retains more electric quantity when the battery voltage is 3.3V or lower. When the voltage value (such as 3.0V) of at least one of the battery 102 and the battery 103 is less than 3.3V and the electric quantity of at least one of the battery 102 and the battery 103 is greater than 10%, that is, the battery voltage value is less than the minimum discharging voltage (3.3V) specified by a system, because the batteries still have available electric quantity of more than 10%, the battery 102 and the battery 103 can be connected in series to increase the voltage of two terminals of the batteries to continue discharging, so as to increase the effective utilization rate of the batteries. Furthermore, because the battery 102 and the battery 103 are boosted by increasing the voltage of the two terminals of the batteries in a series state, a voltage reduction circuit is used for switching the voltage to power supply voltage required by the system, so as to continue supplying power. Because the voltage reduction efficiency is higher, the switching efficiency of the power supply voltages of the batteries is further increased. In addition, in some embodiments, the battery 102 and the battery 103 can be made of a graphite anode material, and the material and type used for the battery 102 and the battery 103 are not limited to the above.

The detection circuit 104 is used for detecting the circuit state, so that the controller 105 generates a control signal for switching series and parallel connection between the battery 102 and the battery 103, and the switching circuit 101 is controlled by the control signal to freely switch series and parallel connections between the battery 102 and the battery 103, thereby greatly increasing the effective utilization ratio of the energy of the battery pack during use, prolonging the cycle life of the battery pack, and enhancing the adaptability of the battery pack to different application scenarios.

In some embodiments, the detection circuit 104 is used for detecting the state value for indicating a failure of the battery 102. In some embodiments, the detection circuit 104 is used for detecting the state value for indicating failure of the battery 103. In some embodiments, the detection circuit 104 is used for detecting the state value for indicating failure of the battery 102 and the state value for indicating failure of the battery 103. In some embodiments, the state value can include a voltage value and a current value of the two terminals of the battery 102 or the battery 103. For example, when the current value of the two terminals of the battery 102 is 0 and the voltage value of the two terminals of the battery 102 is an abnormal operation value, it is determined that the battery 102 has a failure, where the abnormal operation value of the battery can be determined according to record values during historically normal use. In some embodiments, the state value can also include the change value of the voltage or current of the battery 102 or the battery 103. When the change value of the voltage or current with the time is greater than a preset threshold, it is determined that the battery 102 or the battery 103 has a failure, where the preset threshold can be determined according to the change values of the voltage and current of the battery 102 or the battery 103 during historically normal use and failure. It should be noted that the state values for indicating the battery 102 and the battery 103 are not limited to the above.

In some embodiments, the controller 105 generates a control signal according to the state value for indicating failure of the battery 102. The switching circuit 101 switches the battery 102 to a disconnection state according to the control signal. In some embodiments, the controller 105 generates a control signal according to the state value for indicating failure of the battery 103. The switching circuit 101 switches the battery 103 to a disconnection state according to the control signal. The battery 102 or the battery 103 is removed from a circuit in which the battery pack is located, thereby ensuring the safety of the battery pack during charging or discharging and the safety of the load circuit, and further ensuring that the battery pack still can work normally when battery failure occurs. In some embodiments, the controller 105 generates a control signal according to the state value for indicating a failure of the battery 102 and the state value for indicating a failure of the battery 103. After receiving the control signal, the switching circuit 101 switches the load circuit of the battery pack and the information equipment to a disconnection state so as to prevent the load circuit from being damaged when the battery pack has a failure.

In some embodiments, the switching device 100 only includes the switching circuit 101, where the switching circuit 101 is electrically coupled with the battery 102 and the battery 103, and the switching circuit 101 receives the control signal and switches the battery 102 and the battery 103 between a parallel state and a series state. In some embodiments, the switching device 100 only includes the switching circuit 101, where the switching circuit 101 is electrically coupled with the battery 102 and the battery 103, and the switching circuit 101 receives the control signal and switches the battery 102 or the battery 103 to a disconnection state. In some embodiments, the detection circuit 104 and the controller 105 can be mounted on the load circuit of the information equipment instead of in the switching device 100, so that the switching circuit 101 is integrated with the battery 102 and the battery 103 to form a modularized battery pack. In some embodiments, as shown in FIG. 1, the switching circuit 101, the battery 102, the battery 103, the detection circuit 104 and the controller 105 of a detection module can also be integrated into a battery pack. It should be noted that the specific selection of the switching device 100 is not limited to the above.

In some embodiments, the switching circuit 101 includes a plurality of switches. After receiving the control signal of the controller 105, the plurality of switches is switched to a first switch state, a second switch state or a third switch state, wherein when the plurality of switches is switched to the first switch state, the battery 102 and the battery 103 are switched to a parallel state, when the plurality of switches is switched to the second switch state, the battery 102 and the battery 103 are switched to a series state, and when the plurality of switches is switched to the third switch state, the battery 102 or the battery 103 is switched to a disconnection state.

In some embodiments, each of the switches includes a control terminal, a first connecting terminal and a second connecting terminal, where the control terminal is used for receiving the control signal to control the switching-off or switching-on of the first connecting terminal and the second connecting terminal, so that the switch is in a switching-off state or a switching-on state. In some embodiments, the plurality of switches includes MOS (Metal Oxide Semiconductor) transistors. In some embodiments, the plurality of switches includes transistors. In some embodiments, the plurality of switches includes thyristors. In some embodiments, the plurality of switches includes any combination of MOS transistors, transistors and thyristors. The specific selection and implementation modes of the plurality of switches are not limited thereto.

Figure 2:
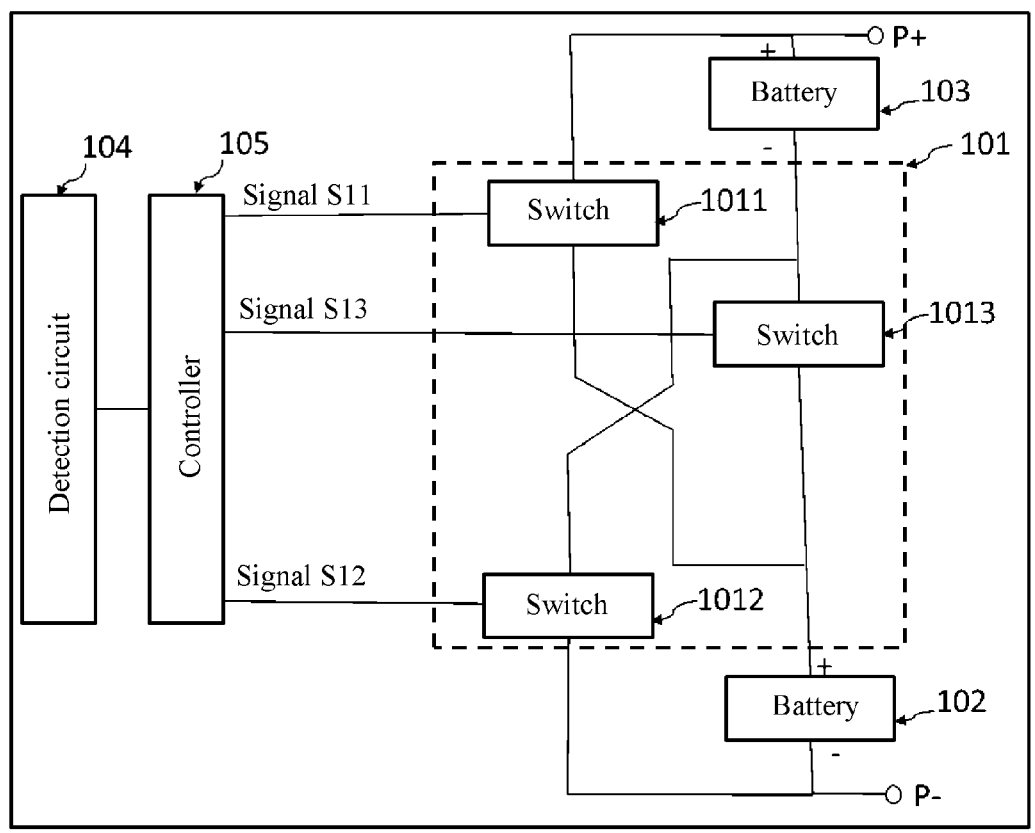
FIG. 2 is a schematic diagram of a circuit structure of a switching device according to some other embodiments of the present application.

FIG. 2 is a schematic diagram of a circuit structure of the switching device 100 according to some embodiments. As shown in FIG. 2, the switching circuit 101 includes a switch 1011, a switch 1012 and a switch 1013. The first connecting terminal of the switch 1011 is electrically connected with the cathode of the battery 102, and the second connecting terminal of the switch 1011 is electrically connected with the cathode of the battery 103. The first connecting terminal of the switch 1012 is electrically connected with the anode of the battery 102, and the second connecting terminal of the switch 1012 is electrically connected with the anode of the battery 103. The first connecting terminal of the switch 1013 is electrically connected with the anode of the battery 103, and the second connecting terminal of the switch 1013 is electrically connected with the cathode of the battery 102. The control signal is received by the control terminal of the switch 1011, the control terminal of the switch 1012 and the control terminal of the switch 1013, so that the switch 1011, the switch 1012 and the switch 1013 form the first switch state, the second switch state or the third switch state. The battery 102 and the battery 103 are charged or discharged through a node P+ and a node P−, where the node P+ can be simultaneously used as a charging cathode or a discharging cathode, and the node P− can be simultaneously used as a charging anode or a discharging anode. In some embodiments, the voltage or current of the node P+ and the node P− can be detected to determine whether the battery 102 and the battery 103 are in a charging state or a discharging state. However, the mode of determining whether the battery 102 and the battery 103 are in a charging state or a discharging state is not limited to the above.

In some embodiments, the control signal includes a signal S11, a signal S12 and a signal S13, the signal S11 is received by the control terminal of the switch 1011, the signal S12 is received by the control terminal of the switch 1012, and the signal S13 is received by the control terminal of the switch 1013.

Figure 3:
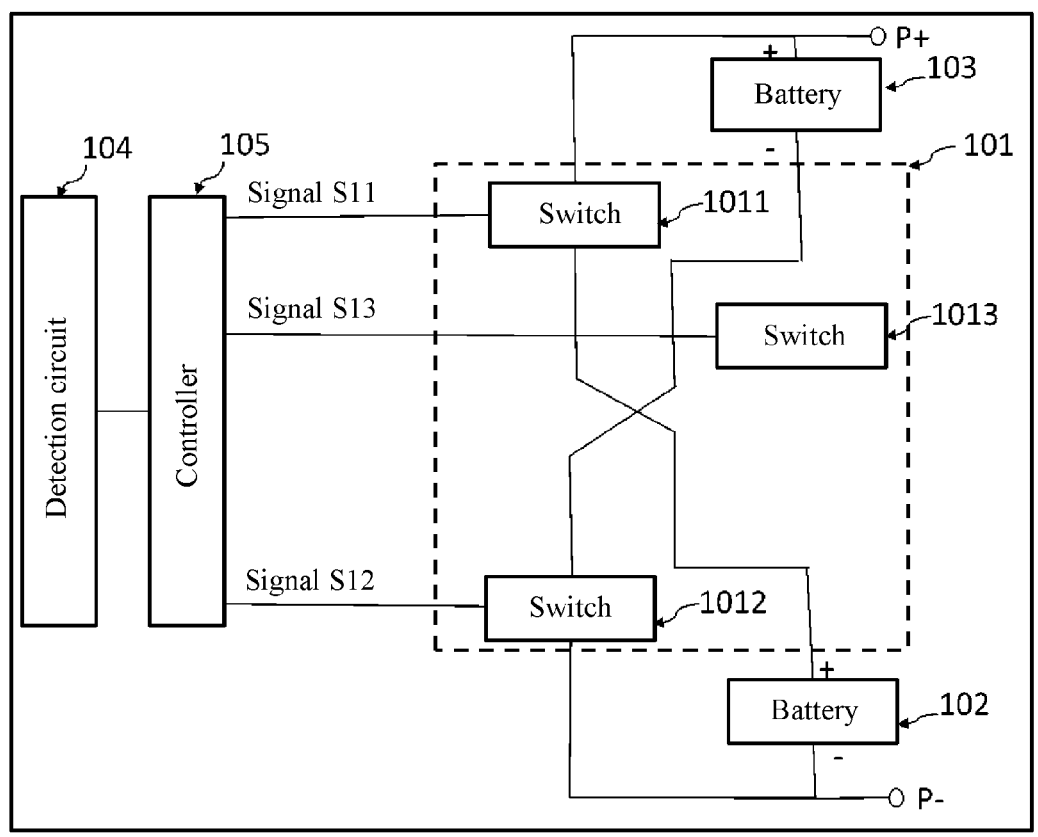
FIG. 3 is a schematic diagram of a circuit structure of a switching device according to some other embodiments of the present application.

FIG. 3 is a schematic diagram of a circuit structure of the switching device 100 according to some embodiments. As shown in FIG. 3, the signal S11 enables the switch 1011 to be in a switching-on state, the signal S12 enables the switch 1012 to be in a switching-on state, and the signal S13 enables the switch 1013 to be in a switching-off state, so that the switch 1011, the switch 1012 and the switch 1013 form the first switch state, and the battery 102 and the battery 103 are switched to a parallel state.

Figure 4:
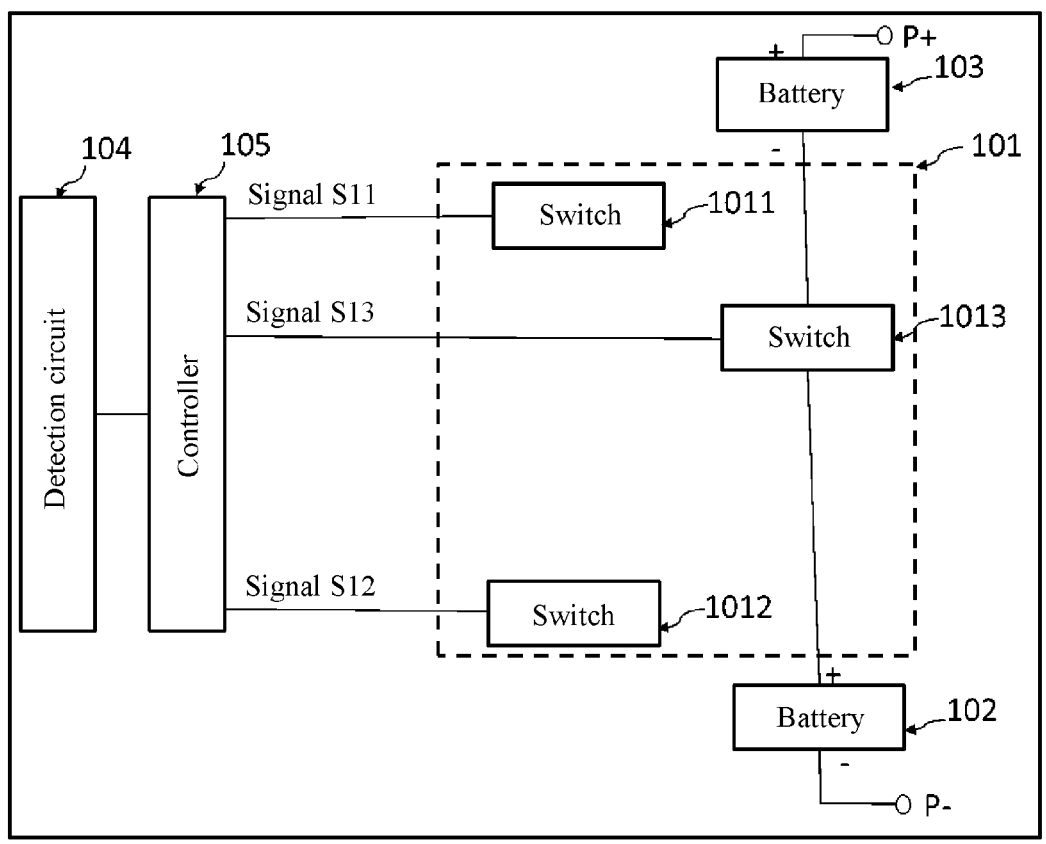
FIG. 4 is a schematic diagram of a circuit structure of a switching device according to some other embodiments of the present application.

FIG. 4 is a schematic diagram of a circuit structure of the switching device 100 according to some embodiments. As shown in FIG. 4, the signal S11 enables the switch 1011 to be in a switching-off state, the signal S12 enables the switch 1012 to be in a switching-off state, and the signal S13 enables the switch 1013 to be in a switching-on state, so that the switch 1011, the switch 1012 and the switch 1013 form the second switch state, and the battery 102 and the battery 103 are switched to a series state.

The switch 1011, the switch 1012 and the switch 1013 are controlled by the control signal to switch the battery 102 and the battery 103 between a parallel state and a series state.

Figure 5:
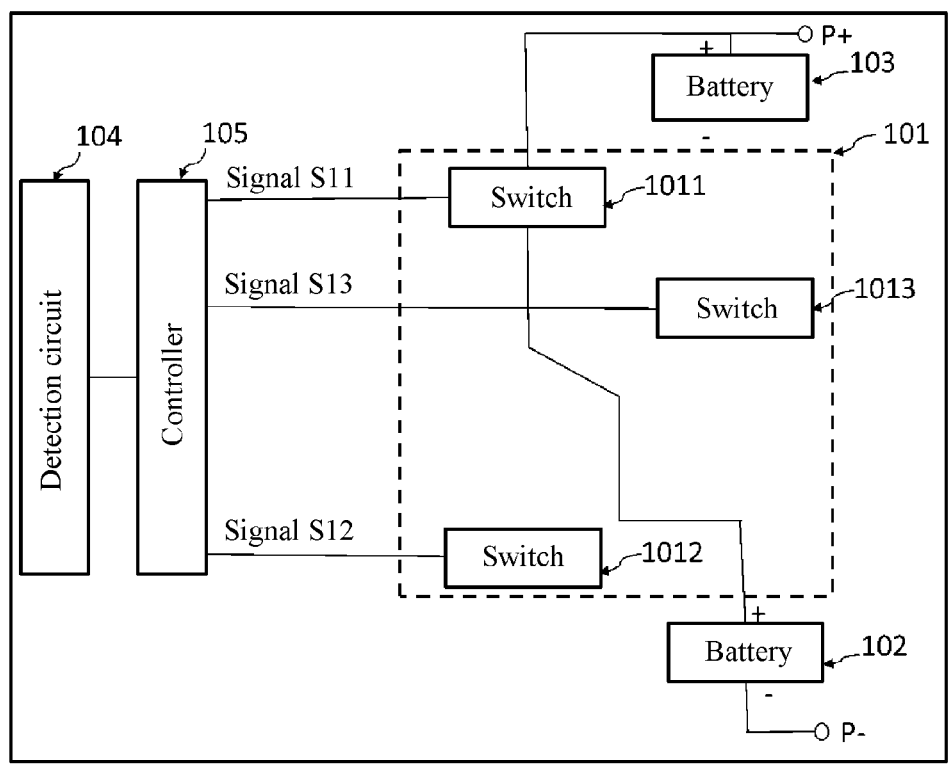
FIG. 5 is a schematic diagram of a circuit structure of a switching device according to some other embodiments of the present application.

FIG. 5 is a schematic diagram of a circuit structure of the switching device 100 according to some embodiments. As shown in FIG. 5, the signal S11 enables the switch 1011 to be in a switching-on state, the signal S12 enables the switch 1012 to be in a switching-off state, and the signal S13 enables the switch 1013 to be in a switching-off state, so that the switch 1011, the switch 1012 and the switch 1013 form the third switch state, and the battery 103 is in a disconnection state.

Figure 6:
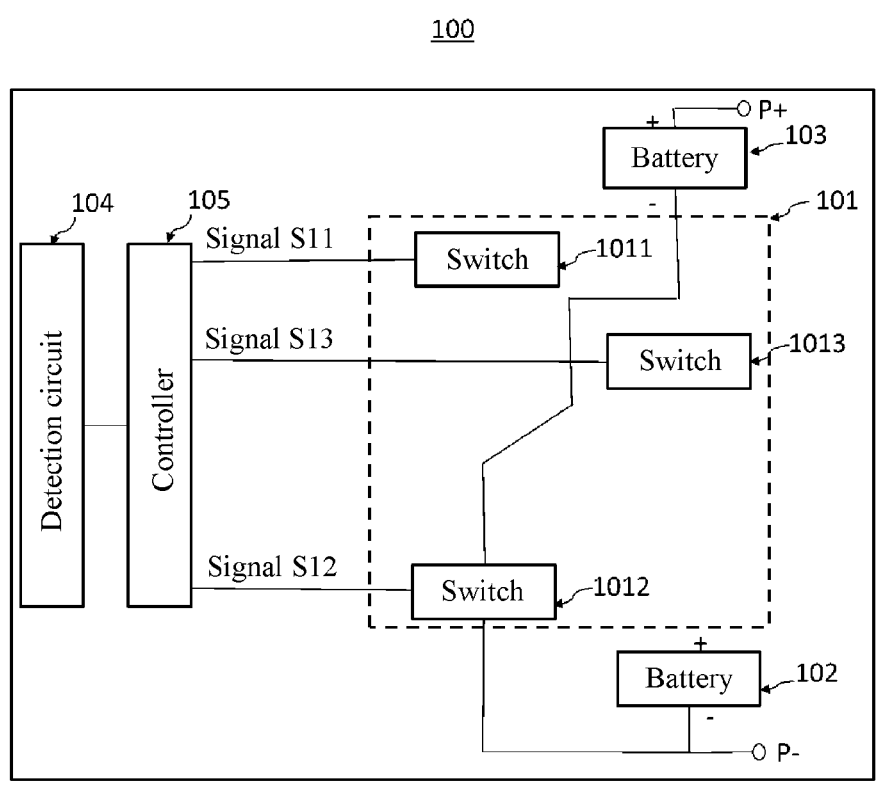
FIG. 6 is a schematic diagram of a circuit structure of a switching device according to some other embodiments of the present application.

FIG. 6 is a schematic diagram of a circuit structure of the switching device 100 according to some embodiments. As shown in FIG. 6, the signal S11 enables the switch 1011 to be in a switching-off state, the signal S12 enables the switch 1012 to be in a switching-on state, and the signal S13 enables the switch 1013 to be in a switching-off state, so that the switch 1011, the switch 1012 and the switch 1013 form the third switch state, and the battery 102 is in a disconnection state.

In some embodiments, the switch 1011, the switch 1012 or the switch 1013 can be an MOS transistor, the control terminal of the switch 1011, the switch 1012 or the switch 1013 is a grid electrode of the MOS transistor, the first connecting terminal of the switch 1011, the switch 1012 or the switch 1013 is a source electrode of the MOS transistor, and the second connecting terminal of the switch 1011, the switch 1012 or the switch 1013 is a drain electrode of the MOS transistor. The specific implementation mode of the switch 1011, the switch 1012 or the switch 1013 is not limited thereto.

Figure 7:
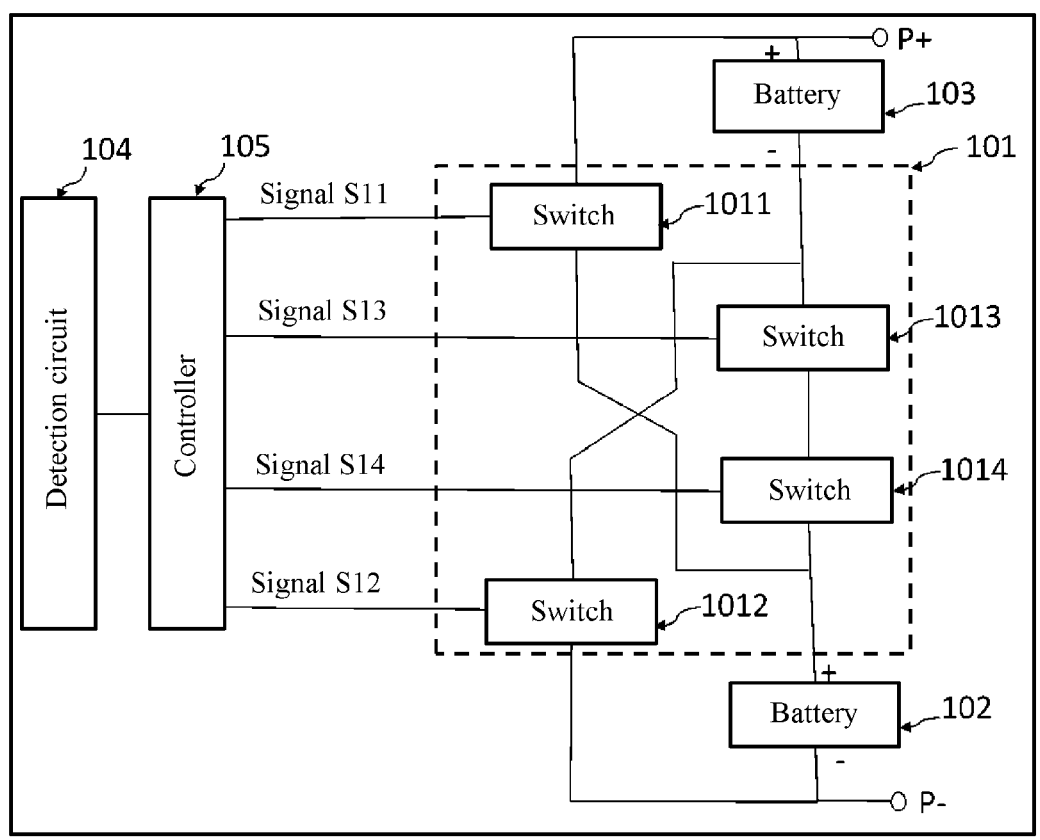
FIG. 7 is a schematic diagram of a circuit structure of a switching device according to some other embodiments of the present application.

FIG. 7 is a schematic diagram of a circuit structure of the switching device according to some embodiments. As shown in FIG. 7, the switching circuit 101 includes a switch 1011, a switch 1012, a switch 1013 and a switch 1014. The first connecting terminal of the switch 1011 is electrically connected with the cathode of the battery 102, and the second connecting terminal of the switch 1011 is electrically connected with the cathode of the battery 103. The first connecting terminal of the switch 1012 is electrically connected with the anode of the battery 102, and the second connecting terminal of the switch 1012 is electrically connected with the anode of the battery 103. The first connecting terminal of the switch 1013 is electrically connected with the anode of the battery 103, the second connecting terminal of the switch 1013 is electrically connected with the second connecting terminal of the switch 1014, and the first connecting terminal of the switch 1014 is electrically connected with the cathode of the battery 102. The control signal is received by the control terminal of the switch 1011, the control terminal of the switch 1012, the control terminal of the switch 1013 and the control terminal of the switch 1014, so that the switch 1011, the switch 1012, the switch 1013 and the switch 1014 form a first switch state, a second switch state or a third switch state.

In some embodiments, the control signal includes a signal S11, a signal S12, a signal S13 and a signal S14, the signal S11 is received by the control terminal of the switch 1011, the signal S12 is received by the control terminal of the switch 1012, the signal S13 is received by the control terminal of the switch 1013, and the signal S14 is received by the control terminal of the switch 1014.

Figure 8:
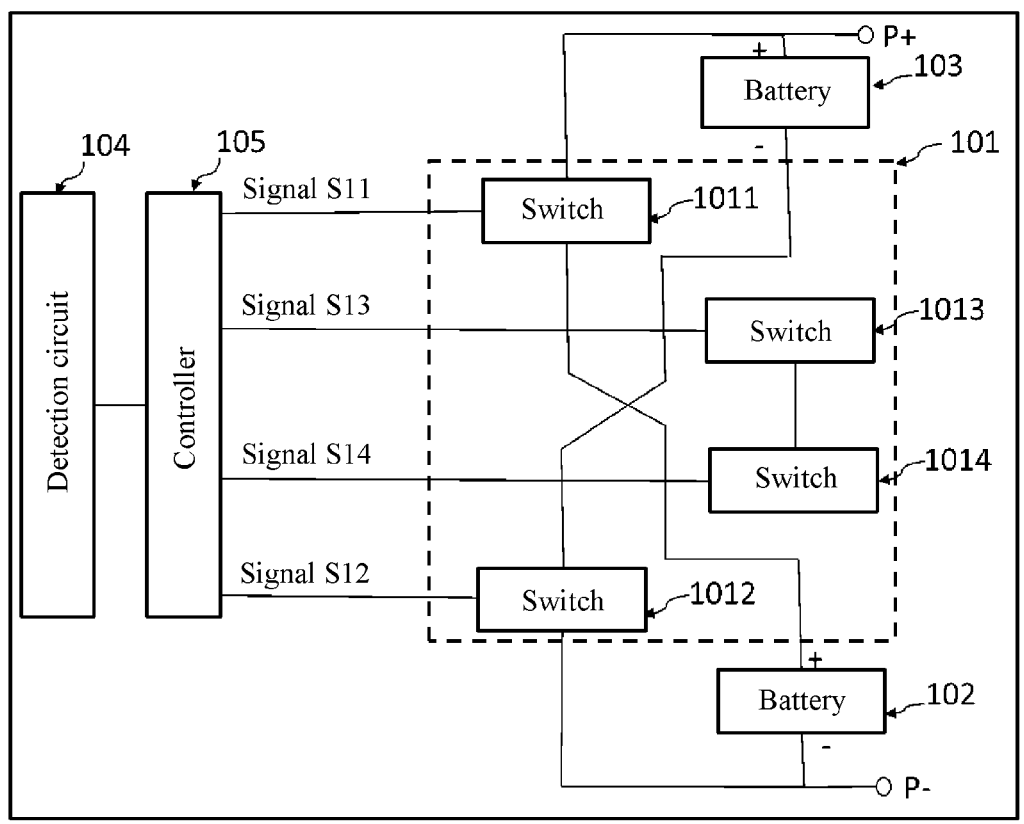
FIG. 8 is a schematic diagram of a circuit structure of a switching device according to some other embodiments of the present application.

FIG. 8 is a schematic diagram of a circuit structure of the switching device 100 according to some embodiments. As shown in FIG. 8, the signal S11 enables the switch 1011 to be in a switching-on state, the signal S12 enables the switch 1012 to be in a switching-on state, the signal S13 enables the switch 1013 to be in a switching-off state, and the signal S14 enables the switch 1014 to be in a switching-off state, so that the switch 1011, the switch 1012, the switch 1013 and the switch 1014 form the first switch state, and the battery 102 and the battery 103 are switched to a parallel state.

Figure 9:
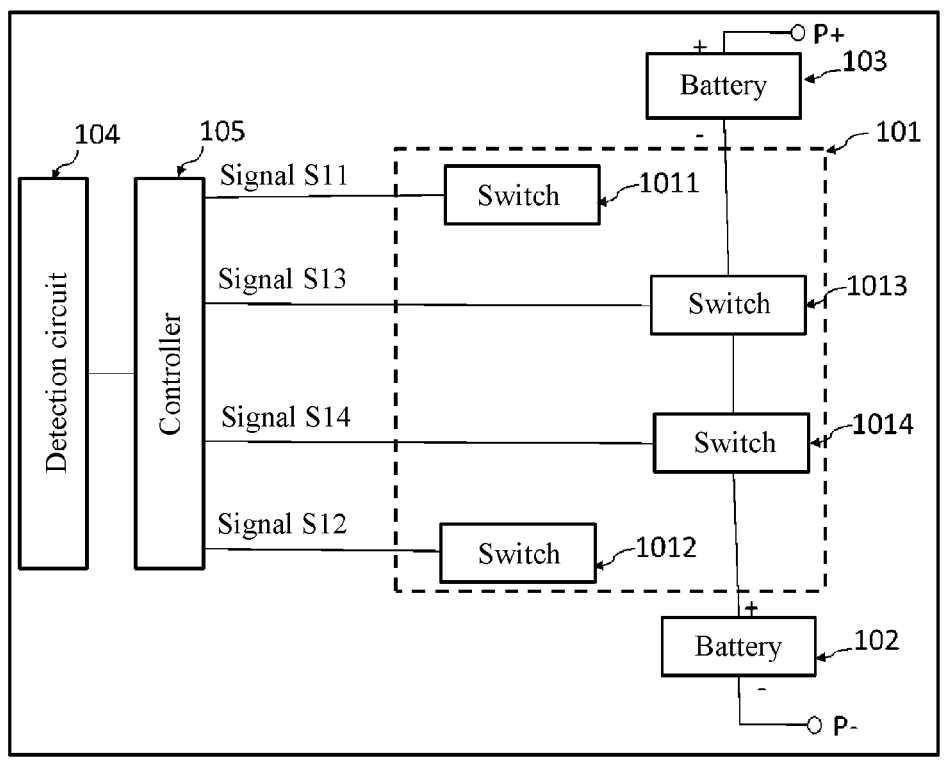
FIG. 9 is a schematic diagram of a circuit structure of a switching device according to some other embodiments of the present application.

FIG. 9 is a schematic diagram of a circuit structure of the switching device 100 according to some embodiments. As shown in FIG. 9, the signal S11 enables the switch 1011 to be in a switching-off state, the signal S12 enables the switch 1012 to be in a switching-off state, the signal S13 enables the switch 1013 to be in a switching-on state, and the signal S14 enables the switch 1014 to be in a switching-on state, so that the switch 1011, the switch 1012, the switch 1013 and the switch 1014 form the second switch state, and the battery 102 and the battery 103 are switched to a series state.

The switch 1011, the switch 1012, the switch 1013 and the switch 1014 are controlled by the control signal to switch the battery 102 and the battery 103 between a parallel state and a series state.

Figure 10:
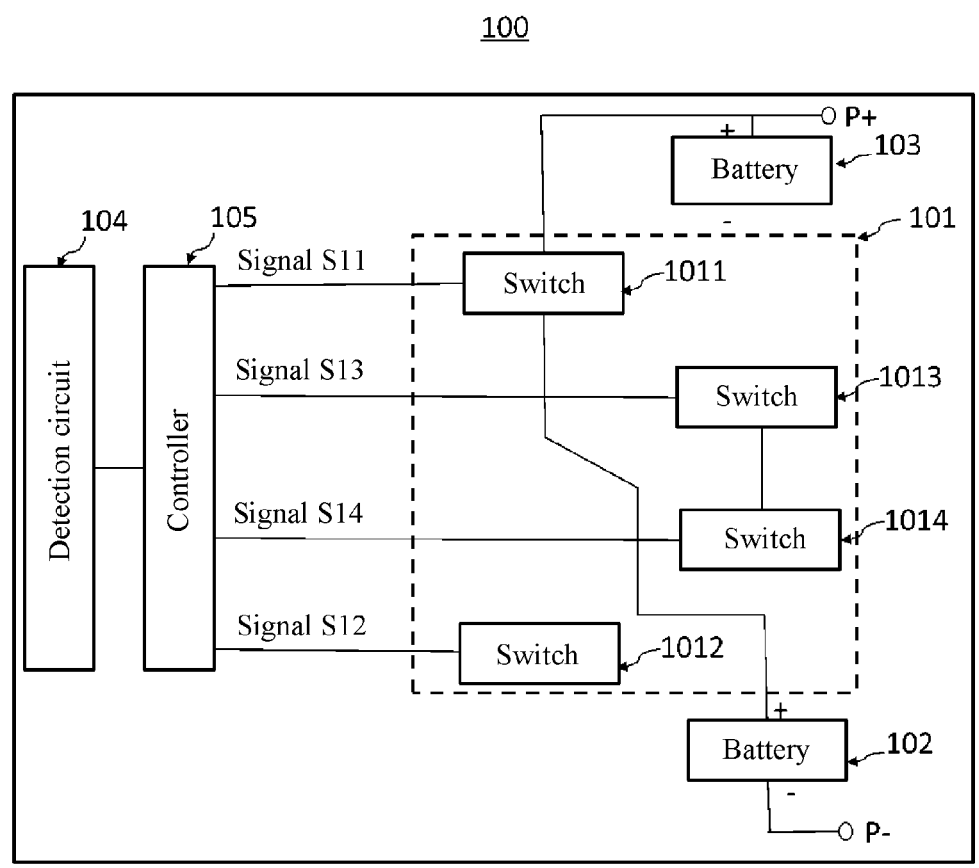
FIG. 10 is a schematic diagram of a circuit structure of a switching device according to some other embodiments of the present application.

FIG. 10 is a schematic diagram of a circuit structure of the switching device 100 according to some embodiments. As shown in FIG. 10, the signal S11 enables the switch 1011 to be in a switching-on state, the signal S12 enables the switch 1012 to be in a switching-off state, the signal S13 enables the switch 1013 to be in a switching-off state, and the signal S14 enables the switch 1014 to be in a switching-off state, so that the switch 1011, the switch 1012, the switch 1013 and the switch 1014 form the third switch state, and the battery 103 is in a disconnection state.

Figure 11:
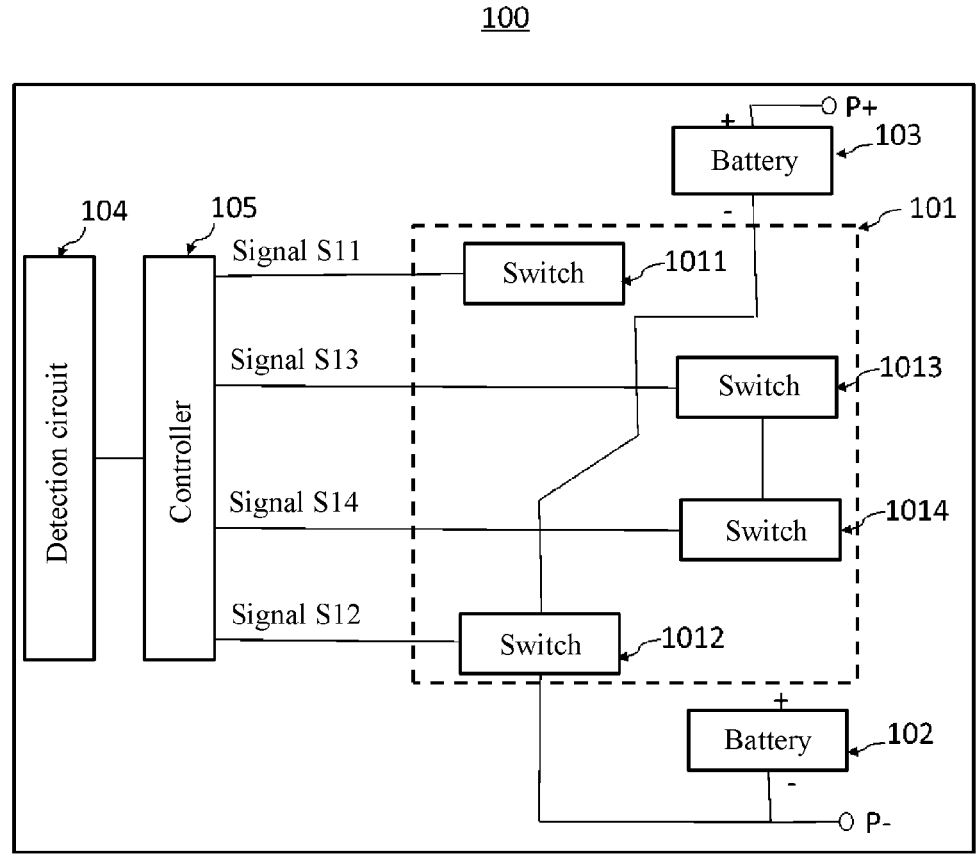
FIG. 11 is a schematic diagram of a circuit structure of a switching device according to some other embodiments of the present application.

FIG. 11 is a schematic diagram of a circuit structure of the switching device 100 according to some embodiments. As shown in FIG. 11, the signal S11 enables the switch 1011 to be in a switching-off state, the signal S12 enables the switch 1012 to be in a switching-on state, the signal S13 enables the switch 1013 to be in a switching-off state, and the signal S14 enables the switch 1014 to be in a switching-off state, so that the switch 1011, the switch 1012, the switch 1013 and the switch 1014 form the third switch state, and the battery 102 is in a disconnection state.

Figure 12:
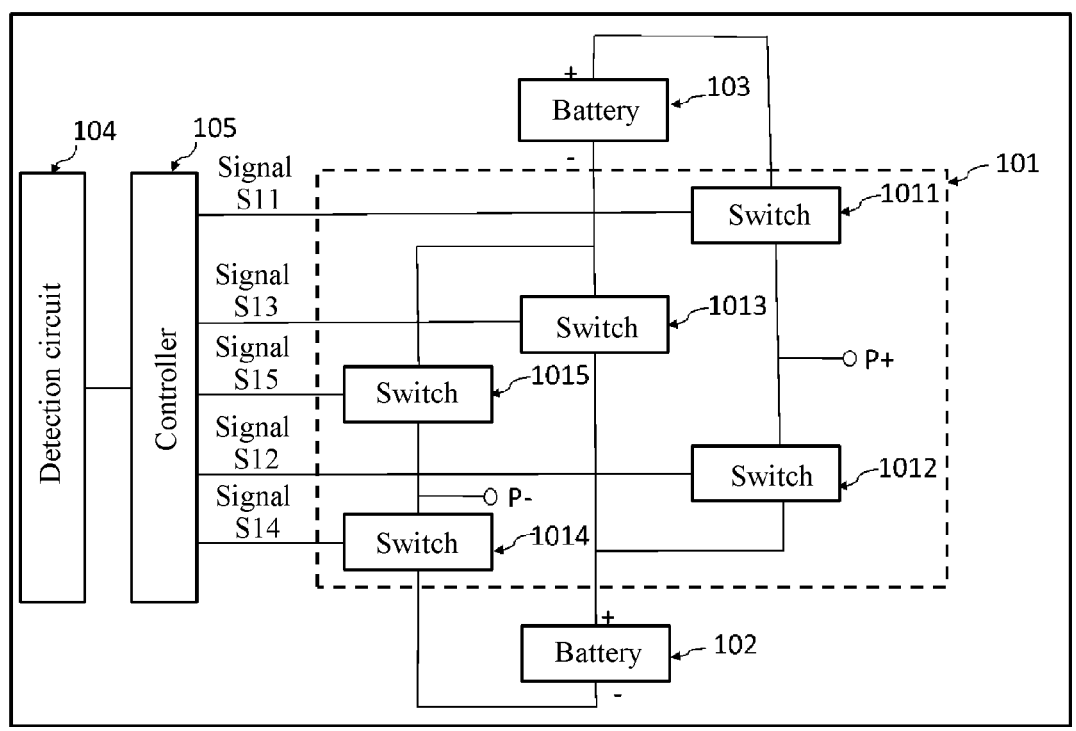
FIG. 12 is a schematic diagram of a circuit structure of a switching device according to some other embodiments of the present application.

FIG. 12 is a schematic diagram of a circuit structure of the switching device 100 according to some embodiments. As shown in FIG. 12, the switching circuit 101 includes a switch 1011, a second switch 1012, a third switch 1013, a fourth switch 1014 and a fifth switch 1015. The first connecting terminal of the switch 1011 is electrically connected with the cathode of the battery 103, and the second connecting terminal of the switch 1011 is electrically connected with the second connecting terminal of the switch 1012. The first connecting terminal of the switch 1012 is electrically connected with the cathode of the battery 102, the first connecting terminal of the switch 1013 is electrically connected with the anode of the battery 103, the second connecting terminal of the switch 1013 is electrically connected with the cathode of the battery 102, the first connecting terminal of the switch 1014 is electrically connected with the anode of the battery 102, the second connecting terminal of the switch 1014 is electrically connected with the second connecting terminal of the switch 1015, and the first connecting terminal of the switch 1015 is electrically connected with the anode of the battery 103. The control signal is received by the control terminal of the switch 1011, the control terminal of the switch 1012, the control terminal of the switch 1013, the control terminal of the switch 1014 and the control terminal of the switch 1015, so that the switch 1011, the switch 1012, the switch 1013, the switch 1014 and the switch 1015 form a first switch state, a second switch state or a third switch state.

In some embodiments, the control signal includes a signal S11, a signal S12, a signal S13, a signal S14 and a signal S15, the signal S11 is received by the control terminal of the switch 1011, the signal S12 is received by the control terminal of the switch 1012, the signal S13 is received by the control terminal of the switch 1013, the signal S14 is received by the control terminal of the switch 1014, and the signal S15 is received by the control terminal of the switch 1015.

Figure 13:
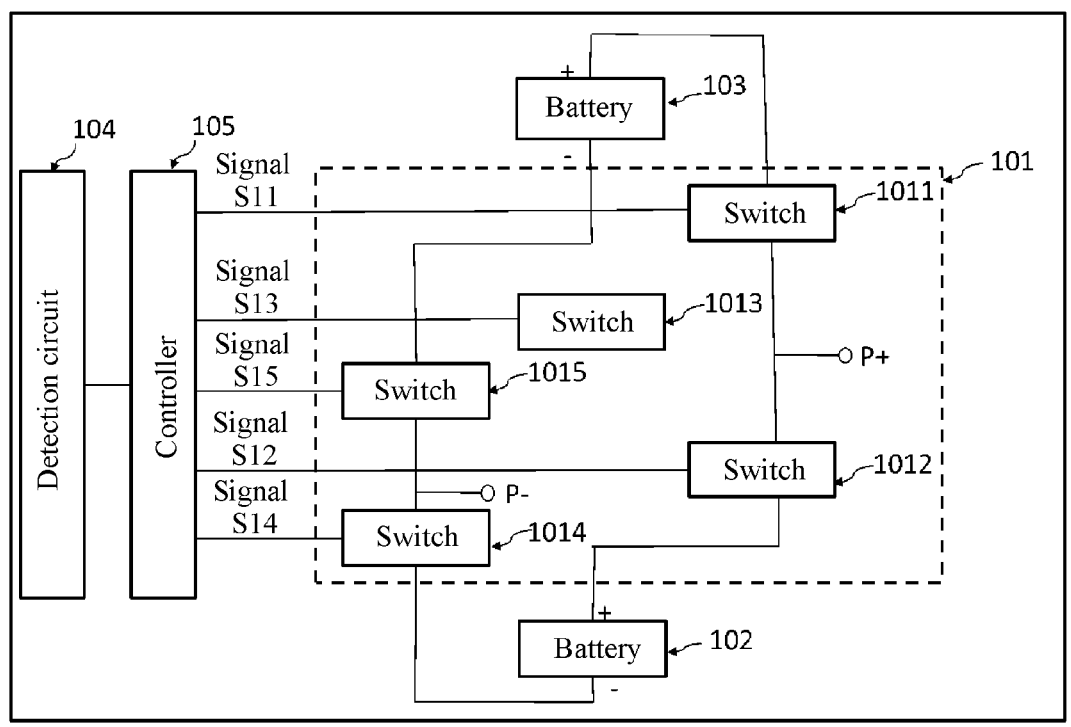
FIG. 13 is a schematic diagram of a circuit structure of a switching device according to some other embodiments of the present application.

FIG. 13 is a schematic diagram of a circuit structure of the switching device 100 according to some embodiments. As shown in FIG. 13, the signal S11 enables the switch 1011 to be in a switching-on state, the signal S12 enables the switch 1012 to be in a switching-on state, the signal S13 enables the switch 1013 to be in a switching-off state, the signal S14 enables the switch 1014 to be in a switching-on state, and the signal S15 enables the switch 1015 to be in a switching-on state, so that the switch 1011, the switch 1012, the switch 1013, the switch 1014 and the switch 1015 form the first switch state, and the battery 102 and the battery 103 are switched to a parallel state.

Figure 14:
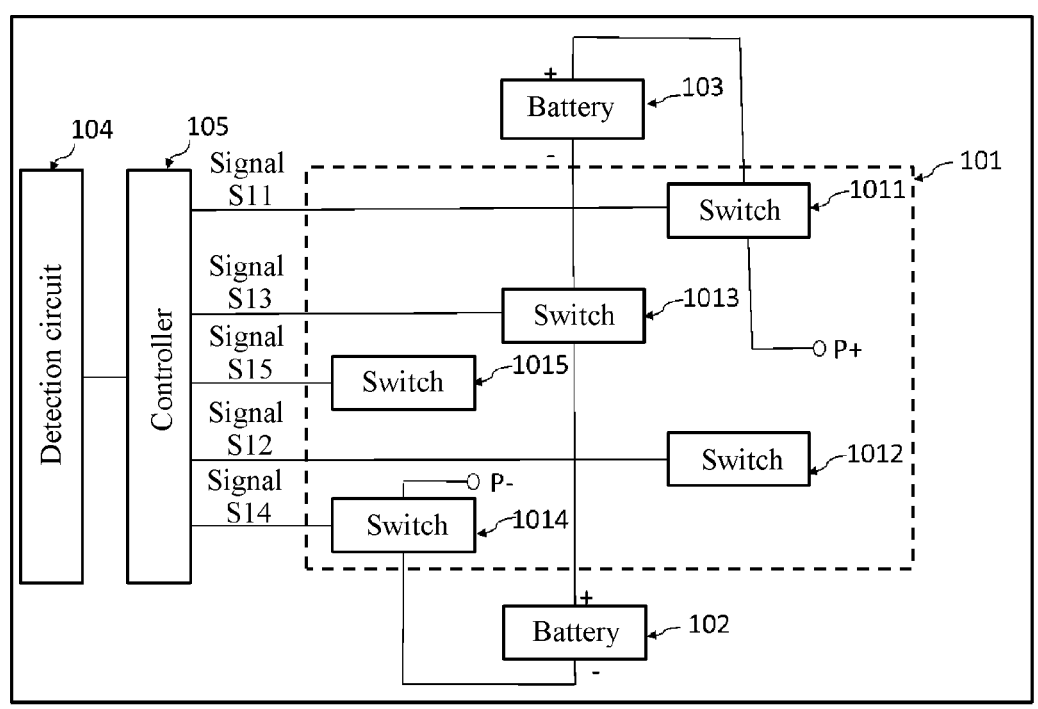
FIG. 14 is a schematic diagram of a circuit structure of a switching device according to some other embodiments of the present application.

FIG. 14 is a schematic diagram of a circuit structure of the switching device 100 according to some embodiments. As shown in FIG. 14, the signal S11 enables the switch 1011 to be in a switching-on state, the signal S12 enables the switch 1012 to be in a switching-off state, the signal S13 enables the switch 1013 to be in a switching-on state, the signal S14 enables the switch 1014 to be in a switching-on state, and the signal S15 enables the switch 1015 to be in a switching-off state, so that the switch 1011, the switch 1012, the switch 1013, the switch 1014 and the switch 1015 form the second switch state, and the battery 102 and the battery 103 are switched to a series state.

The switch 1011, the switch 1012, the switch 1013, the switch 1014 and the switch 1015 are controlled by the control signal to switch the battery 102 and the battery 103 between a parallel state and a series state.

Figure 15:
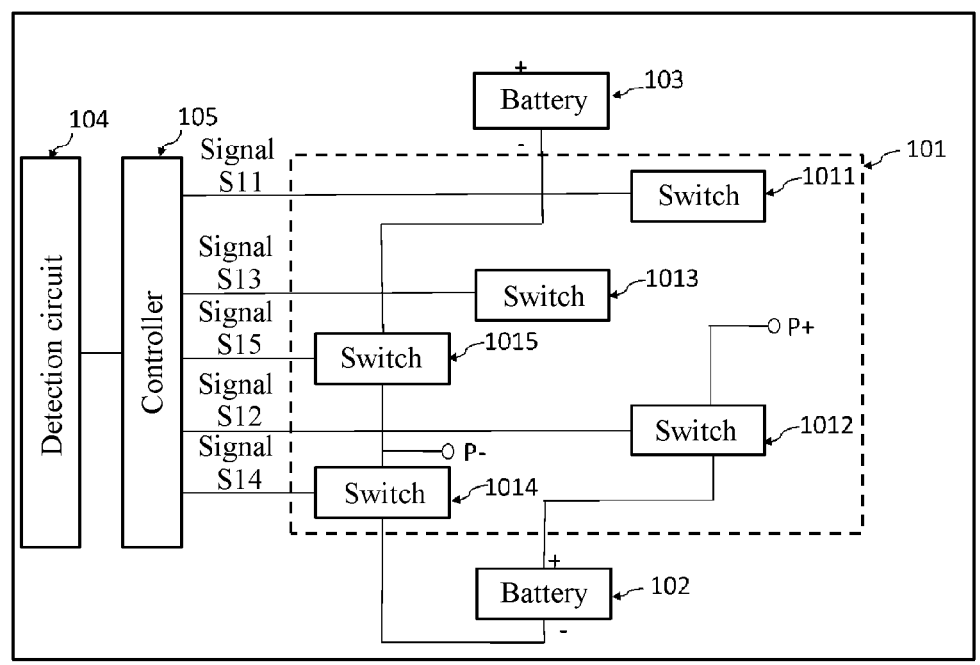
FIG. 15 is a schematic diagram of a circuit structure of a switching device according to some other embodiments of the present application.

FIG. 15 is a schematic diagram of a circuit structure of the switching device 100 according to some embodiments. As shown in FIG. 15, the signal S11 enables the switch 1011 to be in a switching-off state, the signal S12 enables the switch 1012 to be in a switching-on state, the signal S13 enables the switch 1013 to be in a switching-off state, the signal S14 enables the switch 1014 to be in a switching-on state, and the signal S15 enables the switch 1015 to be in a switching-on state, so that the switch 1011, the switch 1012, the switch 1013, the switch 1014 and the switch 1015 form the third switch state, and the battery 103 is in a disconnection state.

Figure 16:
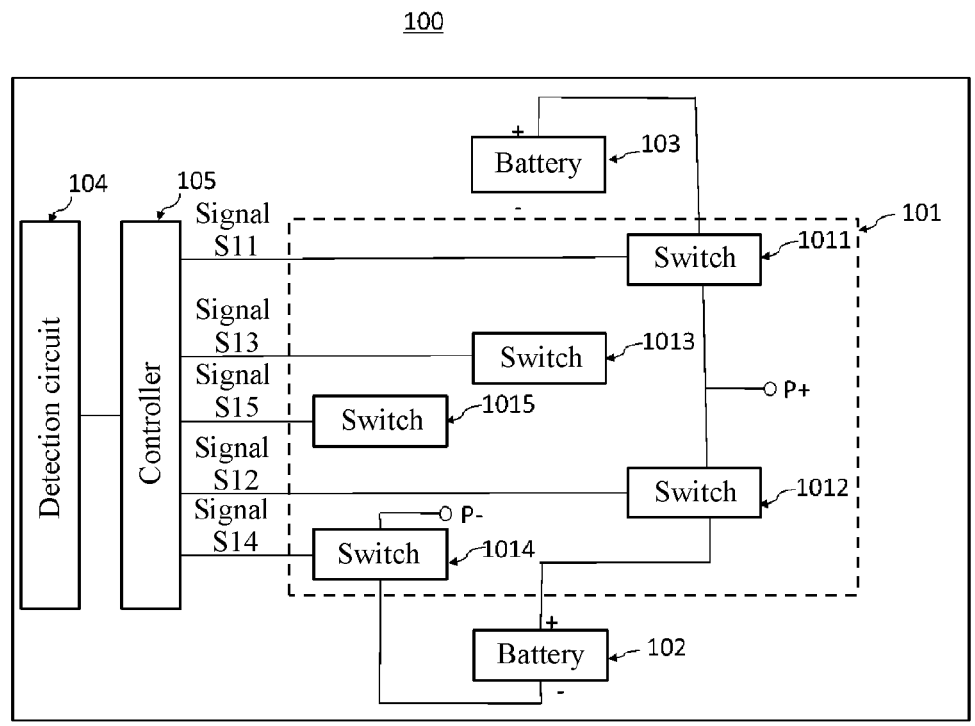
FIG. 16 is a schematic diagram of a circuit structure of a switching device according to some other embodiments of the present application.

FIG. 16 is a schematic diagram of a circuit structure of the switching device 100 according to some embodiments. As shown in FIG. 16, the signal S11 enables the switch 1011 to be in a switching-on state, the signal S12 enables the switch 1012 to be in a switching-on state, the signal S13 enables the switch 1013 to be in a switching-off state, the signal S14 enables the switch 1014 to be in a switching-on state, and the signal S15 enables the switch 1015 to be in a switching-off state, so that the switch 1011, the switch 1012, the switch 1013, the switch 1014 and the switch 1015 form the third switch state, and the battery 103 is in a disconnection state.

Figure 17:
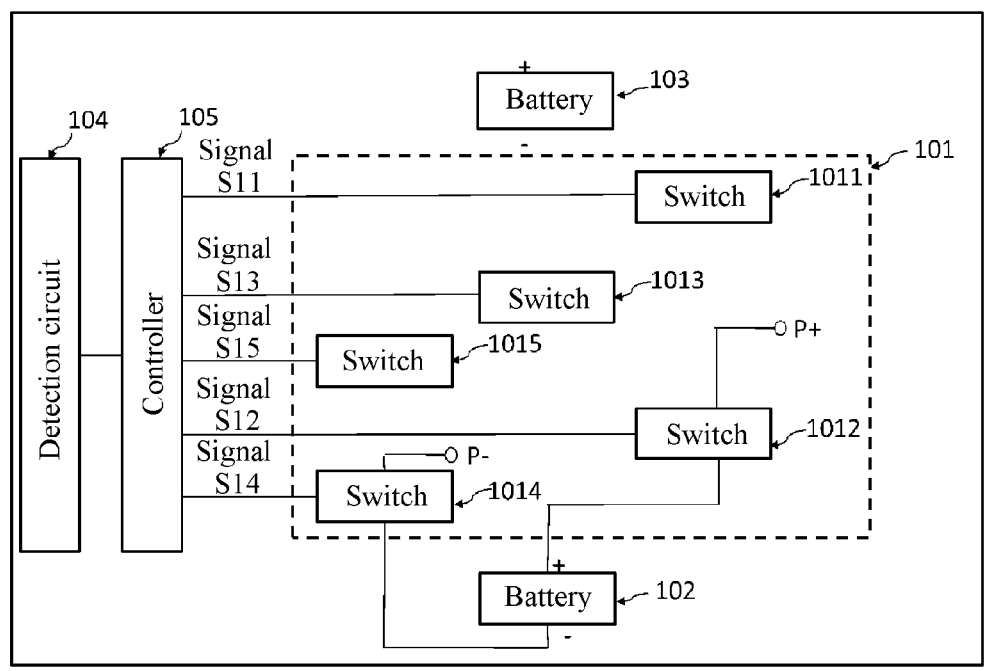
FIG. 17 is a schematic diagram of a circuit structure of a switching device according to some other embodiments of the present application.

FIG. 17 is a schematic diagram of a circuit structure of the switching device 100 according to some embodiments. As shown in FIG. 17, the signal S11 enables the switch 1011 to be in a switching-off state, the signal S12 enables the switch 1012 to be in a switching-on state, the signal S13 enables the switch 1013 to be in a switching-off state, the signal S14 enables the switch 1014 to be in a switching-on state, and the signal S15 enables the switch 1015 to be in a switching-off state, so that the switch 1011, the switch 1012, the switch 1013, the switch 1014 and the switch 1015 form the third switch state, and the battery 103 is in a disconnection state.

Figure 18:
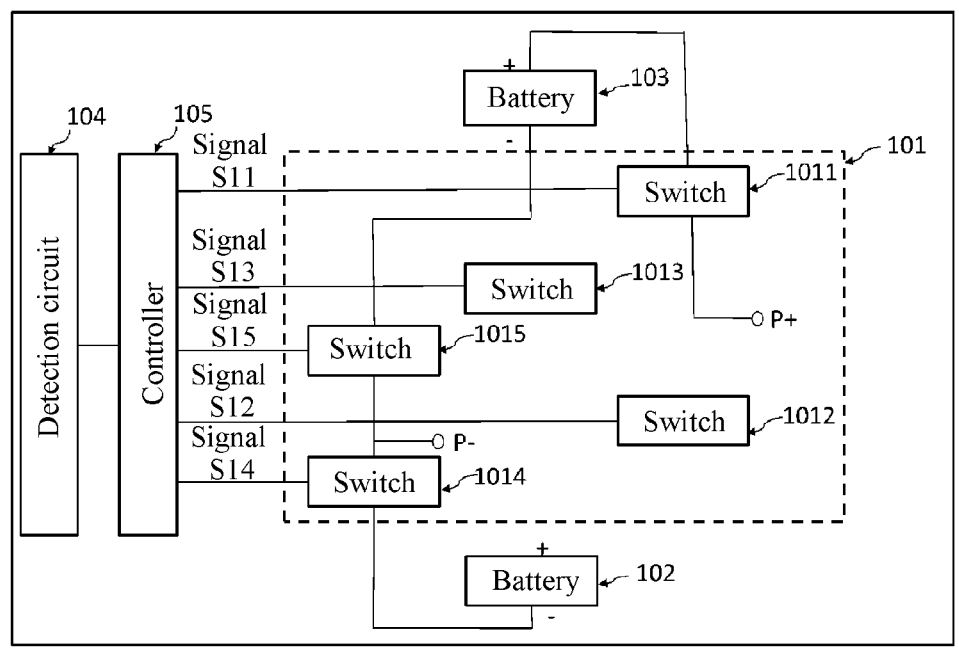
FIG. 18 is a schematic diagram of a circuit structure of a switching device according to some other embodiments of the present application.

FIG. 18 is a schematic diagram of a circuit structure of the switching device 100 according to some embodiments. As shown in FIG. 18, the signal S11 enables the switch 1011 to be in a switching-on state, the signal S12 enables the switch 1012 to be in a switching-on state, the signal S13 enables the switch 1013 to be in a switching-off state, the signal S14 enables the switch 1014 to be in a switching-on state, and the signal S15 enables the switch 1015 to be in a switching-on state, so that the switch 1011, the switch 1012, the switch 1013, the switch 1014 and the switch 1015 form the third switch state, and the battery 102 is in a disconnection state.

Figure 19:
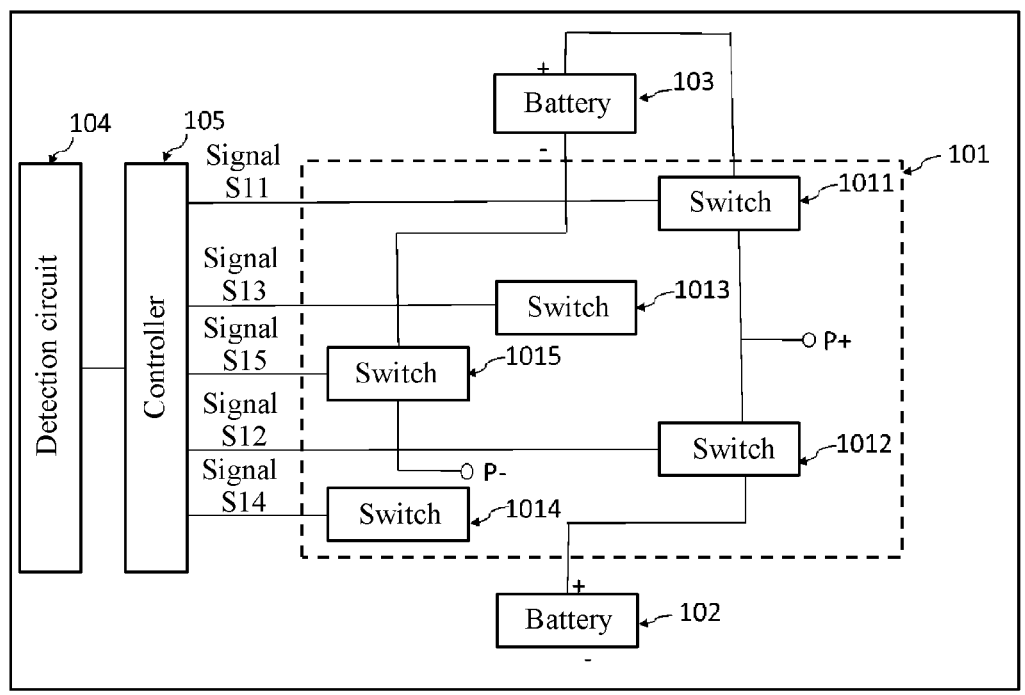
FIG. 19 is a schematic diagram of a circuit structure of a switching device according to some other embodiments of the present application.

FIG. 19 is a schematic diagram of a circuit structure of the switching device 100 according to some embodiments. As shown in FIG. 19, the signal S11 enables the switch 1011 to be in a switching-on state, the signal S12 enables the switch 1012 to be in a switching-on state, the signal S13 enables the switch 1013 to be in a switching-off state, the signal S14 enables the switch 1014 to be in a switching-off state, and the signal S15 enables the switch 1015 to be in a switching-on state, so that the switch 1011, the switch 1012, the switch 1013, the switch 1014 and the switch 1015 form the third switch state, and the battery 102 is in a disconnection state.

Figure 20:
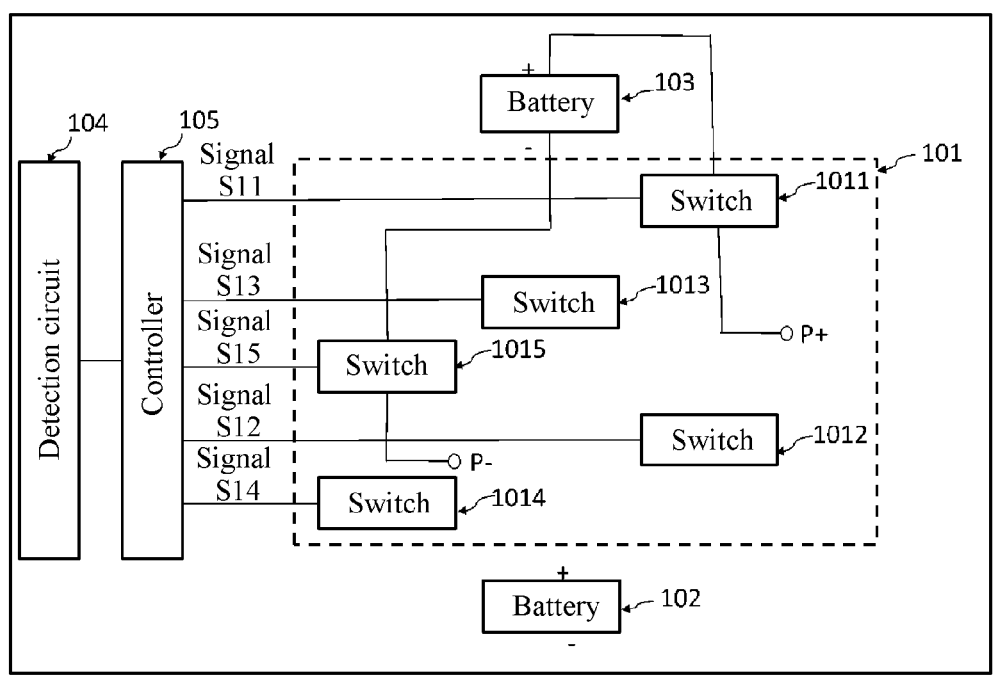
FIG. 20 is a schematic diagram of a circuit structure of a switching device according to some other embodiments of the present application.

FIG. 20 is a schematic diagram of a circuit structure of the switching device 100 according to some embodiments. As shown in FIG. 20, the signal S11 enables the switch 1011 to be in a switching-on state, the signal S12 enables the switch 1012 to be in a switching-off state, the signal S13 enables the switch 1013 to be in a switching-off state, the signal S14 enables the switch 1014 to be in a switching-off state, and the signal S15 enables the switch 1015 to be in a switching-on state, so that the switch 1011, the switch 1012, the switch 1013, the switch 1014 and the switch 1015 form the third switch state, and the battery 102 is in a disconnection state.

Some embodiments of the present application also provide a battery pack device, including a battery pack and the switching device in the above embodiments. The battery pack is electrically coupled with the switching device. The battery pack includes a plurality of batteries, where the plurality of batteries at least includes a battery 102 and a battery 103. In some embodiments, at least one of the plurality of batteries is made of a silicon anode material.

References to "some embodiments", "part of embodiments", "one embodiment", "another example", "example", "specific example" or "part of examples" in the whole specification mean that at least one embodiment or example in the present application comprises specific features, structures, materials or characteristics described in the embodiments or examples. Thus, the descriptions appear throughout the specification, such as "in some embodiments", "in an embodiment", "in one embodiment", "in another example", "in one example", "in a specific example" or "an example", which does not necessarily refer to the same embodiment or example in the present application.

Although the illustrative embodiments have been shown and described, it should be understood by those skilled in the art that the above embodiments cannot be interpreted as limiting the present application, and the embodiments can be changed, substituted and modified without departing from the spirit, principle and scope of the present application.

What is claimed is:

1. A series-parallel switching device used for a battery pack, wherein the battery pack comprises a first battery and a second battery; and the switching device comprises:
   a switching circuit, configured to be electrically coupled with the first battery and the second battery,
   a detection circuit, wherein the detection circuit detects a circuit state, and
   a controller;
   wherein the switching circuit is coupled to the controller and receives a control signal from the controller, and the switching circuit is controlled by the control signal to switch the first battery and the second battery between a parallel state, a series state, and a disconnection state;
   the circuit state comprises a first state value for indicating failure of the first battery or a second state value for indicating failure of the second battery;
   wherein, when the detection circuit detects at least one of the first state value or the second state value, the controller generates the control signal according to the circuit state and transmits the control signal to the switching circuit; and
   the switching circuit switches the first battery or the second battery to the disconnection state according to the control signal.

2. The switching device according to claim 1,
   wherein the circuit state further comprises one or more of the following: a voltage value of the first battery, a voltage value of the second battery, a charging power of the first battery, a charging power of the second battery, an electric quantity of the first battery, an electric quantity of the second battery, the first battery is in a charging state or a discharging state, and the second battery is in a charging state or a discharging state.

3. The switching device according to claim 2, wherein the circuit state comprises the voltage value of the first battery and the voltage value of the second battery;

the detection circuit detects the voltage value of the first battery and the voltage value of the second battery in the charging state and the series state;

the controller determines a voltage difference between the voltage value of the first battery and the voltage value of the second battery, and generates the control signal when the voltage difference is greater than a first threshold; and the switching circuit switches the first battery and the second battery in the charging state from the series state to the parallel state according to the control signal.

4. The switching device according to claim 2, wherein the circuit state comprises the charging power of the first battery and the charging power of the second battery;

the detection circuit detects the charging power of the first battery and the charging power of the second battery in the charging state and the parallel state;

the controller generates the control signal when the charging power of the first battery or the charging power of the second battery is greater than a second threshold; and the switching circuit switches the first battery and the second battery in the charging state from the parallel state to the series state according to the control signal.

5. The switching device according to claim 2, wherein the circuit state comprises the voltage value of the first battery and the voltage value of the second battery;

the detection circuit detects the voltage value of at least one of the first battery or the second battery in the discharging state and the series state;

the controller generates the control signal when the voltage value is within a first range; and the switching circuit switches the first battery and the second battery in the discharging state from the series state to the parallel state according to the control signal.

6. The switching device according to claim 2, wherein the detection circuit detects the voltage value and the electric quantity of at least one of the first battery and the second battery in the discharging state and the parallel state;

the controller generates the control signal when the voltage value is less than a third threshold and the electric quantity is greater than a fourth threshold; and the switching circuit switches the first battery and the second battery in the discharging state from the parallel state to the series state according to the control signal.

7. The switching device according to claim 1, wherein the switching circuit comprises a plurality of switches;

the plurality of switches are switched to a first switch state, a second switch state or a third switch state after receiving the control signal;

wherein when the plurality of switches are switched to the first switch state, the first battery and the second battery are switched to the parallel state; when the plurality of switches are switched to the second switch state, the first battery and the second battery are switched to the series state; and when the plurality of switches are switched to the third switch state, the first battery or the second battery is in the disconnection state; wherein each of the plurality of switches comprises a control terminal, a first connecting terminal and a second connecting terminal, and the control terminal is used for receiving the control signal to control the switching-off or switching-on of the first connecting terminal and the second connecting terminal so as to enable the switch to be in a switching-off state or a switching-on state.

8. The switching device according to claim 7, wherein the plurality of switches comprises a first switch, a second switch and a third switch, the first connecting terminal of the first switch is electrically connected with the cathode of the first battery, the second connecting terminal of the first switch is electrically connected with the cathode of the second battery, the first connecting terminal of the second switch is electrically connected with the anode of the first battery, the second connecting terminal of the second switch is electrically connected with the anode of the second battery, the first connecting terminal of the third switch is electrically connected with the anode of the second battery, and the second connecting terminal of the third switch is electrically connected with the cathode of the first battery; and the control signal is received by the control terminal of the first switch, the control terminal of the second switch and the control terminal of the third switch, so that the first switch, the second switch and the third switch form the first switch state, the second switch state or the third switch state.

9. The switching device according to claim 8, wherein when the first switch and the second switch are in a switching-on state and the third switch is in a switching-off state, the first switch, the second switch and the third switch form the first switch state; and when the first switch and the second switch are in the switching-off state and the third switch is in the switching-on state, the first switch, the second switch and the third switch form the second switch state.

10. The switching device according to claim 8, wherein when the first switch is in a switching-on state and the second switch and the third switch are in a switching-off state, the first switch, the second switch and the third switch form the third switch state, so that the second battery is in the disconnection state; and when the first switch and the third switch are in a switching-off state and the second switch is in a switching-on state, the first switch, the second switch and the third switch form the third switch state, so that the first battery is switched to the disconnection state.

11. The switching device according to claim 7, wherein the plurality of switches comprises a first switch, a second switch, a third switch and a fourth switch, the first connecting terminal of the first switch is electrically connected with the cathode of the first battery, the second connecting terminal of the first switch is electrically connected with the cathode of the second battery, the first connecting terminal of the second switch is electrically connected with the anode of the first battery, the second connecting terminal of the second switch is electrically connected with the anode of the second battery, the first connecting terminal of the third switch is electrically connected with the anode of the second battery, the second connecting terminal of the third switch is electrically connected with the second connecting terminal of the fourth switch, and the first connecting terminal of the fourth switch is electrically connected with the cathode of the first battery; and the control signal is received by the control terminal of the first switch, the control terminal of the second switch, the control terminal of the third switch and the control terminal of the fourth switch, so that the first switch, the second switch, the third switch and the fourth switch form the first switch state, the second switch state or the third switch state.

12. The switching device according to claim 11, wherein when the first switch and the second switch are in a switching-on state and the third switch and the fourth switch are in a switching-off state, the first switch, the second switch, the third switch and the fourth switch form the first switch state; and when the first switch and the second switch are in the switching-off state and the third switch and the fourth switch are in the switching-on state, the first switch, the second switch, the third switch and the fourth switch form the second switch state.

13. The switching device according to claim 11, wherein when the first switch is in a switching-on state and the second switch, the third switch and the fourth switch are in a switching-off state, the first switch, the second switch, the third switch and the fourth switch form the third switch state, so that the second battery is switched to a disconnection state; and when the first switch, the third switch and the fourth switch are in the switching-off state and the second switch is in the switching-on state, the first switch, the second switch, the third switch and the fourth switch form the third switch state, so that the first battery is switched to a disconnection state.

14. The switching device according to claim 7, wherein the plurality of switches comprises a first switch, a second switch, a third switch, a fourth switch and a fifth switch, the first connecting terminal of the first switch is electrically connected with the cathode of the second battery, the second connecting terminal of the first switch is electrically connected with the second connecting terminal of the second switch, the first connecting terminal of the second switch is electrically connected with the cathode of the first battery, the first connecting terminal of the third switch is electrically connected with the anode of the second battery, the second connecting terminal of the third switch is electrically connected with the cathode of the first battery, the first connecting terminal of the fourth switch is electrically connected with the anode of the first battery, the second connecting terminal of the fourth switch is electrically connected with the second connecting terminal of the fifth switch, and the first connecting terminal of the fifth switch is electrically connected with the anode of the second battery; and the control signal is received by the control terminal of the first switch, the control terminal of the second switch, the control terminal of the third switch, the control terminal of the fourth switch and the control terminal of the fifth switch, so that the first switch, the second switch, the third switch, the fourth switch and the fifth switch form the first switch state, the second switch state or the third switch state.

15. The switching device according to claim 14, wherein when the first switch, the second switch, the fourth switch and the fifth switch are in a switching-on state and the third switch is in a switching-off state, the first switch, the second switch, the third switch, the fourth switch and the fifth switch form the first switch state; and when the first switch, the third switch and the fourth switch are in the switching-on state and the second switch and the fifth switch are in the switching-off state, the first switch, the second switch, the third switch, the fourth switch and the fifth switch form the second switch state.

16. The switching device according to claim 14, wherein when the second switch and the fourth switch are in a switching-on state, the third switch is in a switching-off state, and at least one of the first switch and the fifth switch is in a switching-off state, the first switch, the second switch, the third switch, the fourth switch and the fifth switch form the third switch state, so that the second battery is switched to a disconnection state; and when the first switch and the fifth switch are in the switching-on state, the third switch is in the switching-off state, and at least one of the second switch and the fourth switch is in a switching-off state, the first switch, the second switch, the third switch, the fourth switch and the fifth switch form the third switch state, so that the first battery is switched to a disconnection state.

\* \* \* \* \*